United States Patent [19]

Lacour-Gayet

[11] Patent Number: 4,486,836

[45] Date of Patent: Dec. 4, 1984

[54] WELL LOGGING: UTILIZING SUPERPOSITION OF STEP-PROFILE RESPONSES OF LOGGING TOOLS TO IMPROVE LOGS

[75] Inventor: Philippe J. Lacour-Gayet, London, England

[73] Assignee: Schlumberger Technology Corporation, New York, N.Y.

[21] Appl. No.: 333,446

[22] Filed: Dec. 22, 1981

[51] Int. Cl.$^3$ .................. E21B 49/00; G06F 15/20
[52] U.S. Cl. .................. 364/422; 73/152; 324/323; 324/339
[58] Field of Search ............. 364/422; 324/323, 339; 73/152; 367/25, 33; 340/853

[56] References Cited

U.S. PATENT DOCUMENTS

| | | | |
|---|---|---|---|
| 3,946,604 | 3/1976 | Anderson | 73/152 |
| 4,297,879 | 11/1981 | Howells et al. | 73/152 |
| 4,313,164 | 1/1982 | Regat | 364/422 |
| 4,314,338 | 2/1982 | Svau et al. | 364/422 |
| 4,346,593 | 8/1982 | Howells et al. | 73/152 |
| 4,350,979 | 9/1982 | Eberwein | 340/861 |

*Primary Examiner*—Errol A. Krass
*Assistant Examiner*—Clifford L. Tager
*Attorney, Agent, or Firm*—Cooper, Dunham, Clark, Griffin & Moran

[57] ABSTRACT

Disclosed is a method of improving well logs, such as induction logs and LATEROLOGS, by taking into account the effect on a log measurement both of the particular bed in which it is taken and of one or more other beds. In one example the process starts with an original induction log and a provisional layered formation which is based thereon and is characterized by bed boundaries and constant induction log levels within a bed. A provisional reconstructed log is built up by applying the tool response to the layered formation by a new technique which makes this expedient enough to be practicable. The reconstructed log is matched against the original log, and the layered formation is refined accordingly, by adding and/or shifting boundaries and/or by changing the measurement levels within beds, until the match is satisfactory. The original log is then converted to an improved log on the basis of the latest layered formation. Modifications include use of LATEROLOG measurements to improve LATEROLOGS and to improve induction logs.

12 Claims, 18 Drawing Figures

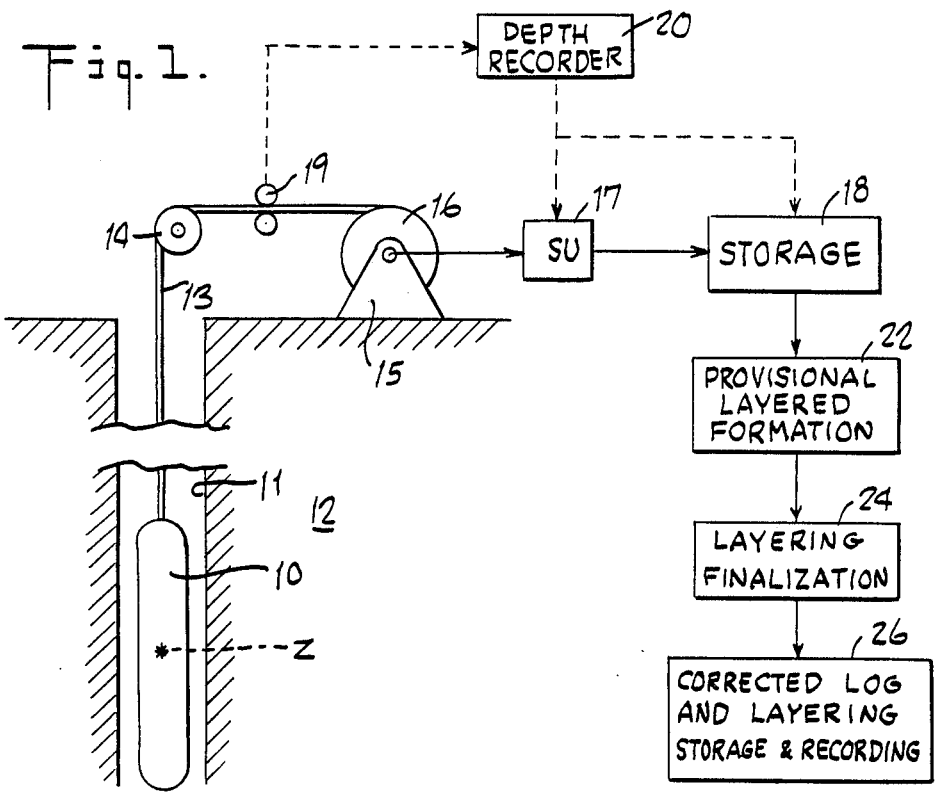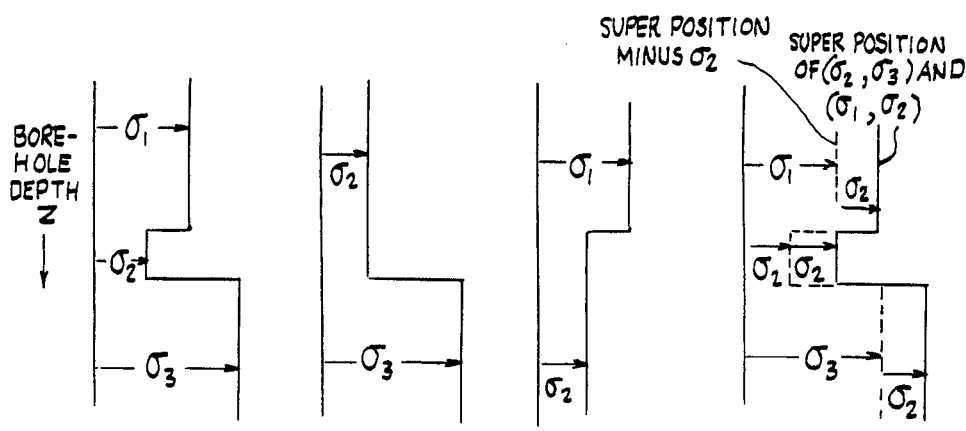

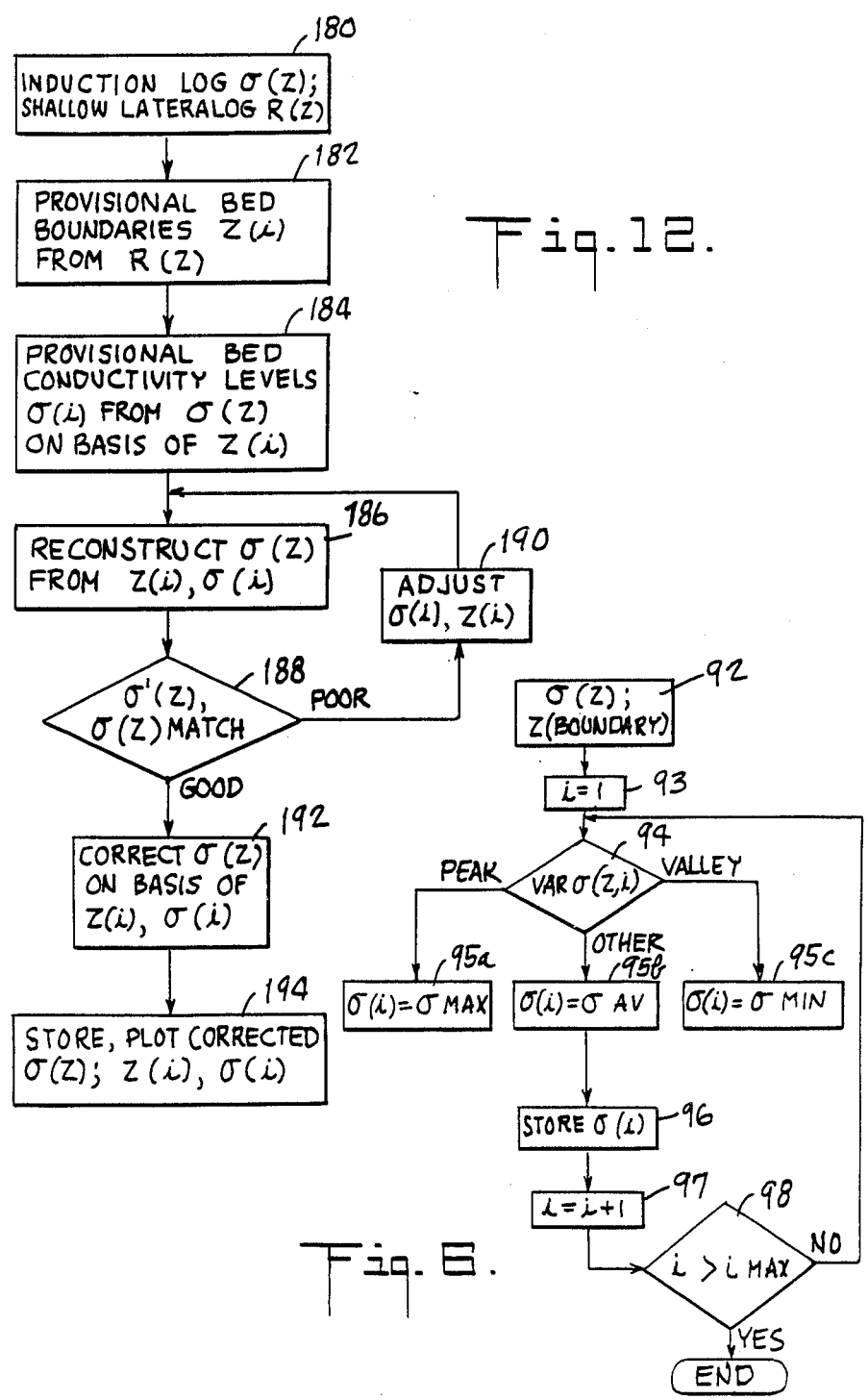

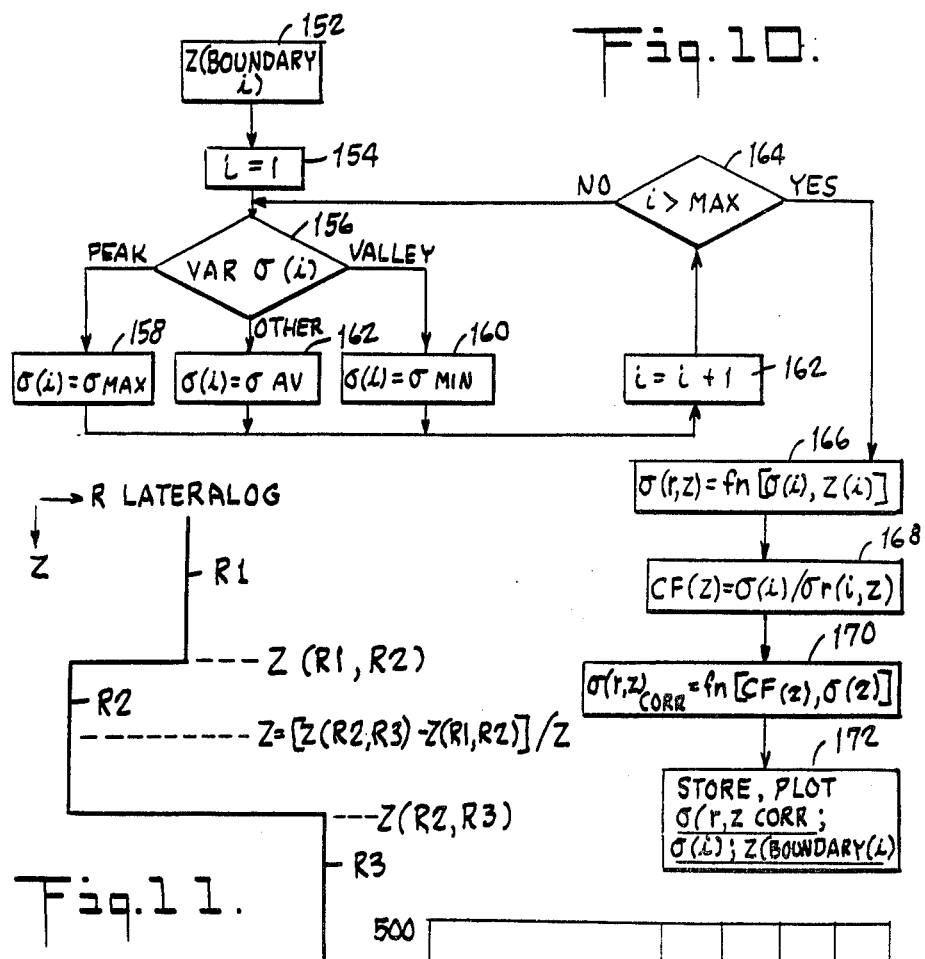
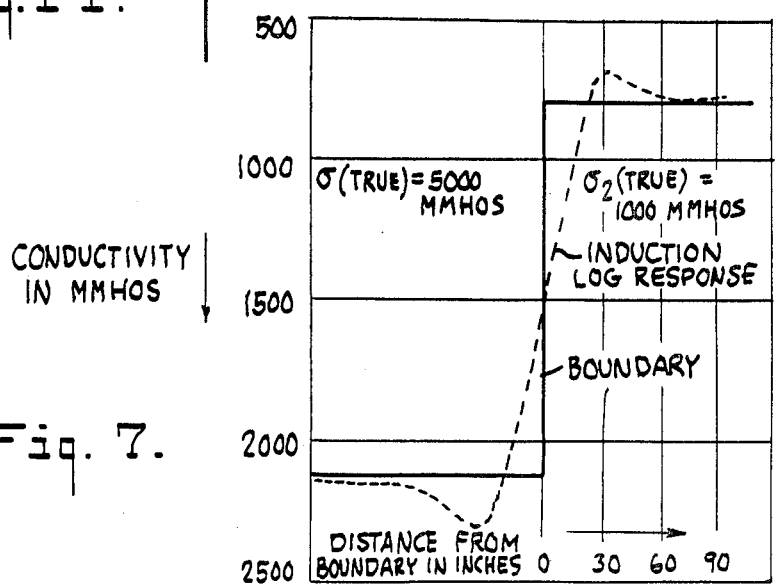

WELL LOGGING: UTILIZING SUPERPOSITION OF STEP-PROFILE RESPONSES OF LOGGING TOOLS TO IMPROVE LOGS

BACKGROUND AND SUMMARY OF THE INVENTION

The invention is in the field of well logging, in which measurements taken in boreholes are used in searching for and exploiting valuable underground resources such as oil and gas, and concerns improving logs to account for the effect on a log measurement both of the bed in which it is taken and of one or more other beds.

A measurement taken with a logging tool at a given depth level in a borehole typically is influenced by the formation at that depth level as well as by the formation at other depth levels, which may well be in other subsurface beds, and by the inherent characteristics of the tool itself. It has been proposed to use a linear filter to approximate the tool response and thereby seek to remove it, particularly in the case of the induction log response at low conductivities. See Doll, H. G., Introduction to Induction Logging and Application to Logging of Wells Drilled With Oil-Base Mud, J.P.T., Vol. 1, No. 6, June 1949. It is believed that while this technique gives good results at low formation conductivities, it is not sufficiently accurate at medium and high conductivities, probably due to skin effect and associated nonlinearities of the tool response. It has been proposed, in addition, to adapt the linear filter proposal in order to account for skin effect, by providing different linear filters for different conductivities, and filter charts have been developed for the purpose. Still in addition, it has been proposed to use a layered model and a linear filter for each conductivity assuming infinitely homogeneous formations. See U.K. patent specification No. 1,405,311 and U.S. patent application Ser. No. 019,917 (now U.S Pat. No. 4,314,338); U.S. application Ser. No. 019,918 (now U.S. Pat. No. 4,340,934); U.S. application Ser. No. 019,925 (now U.S. Pat. No. 4,314,339) and U.S. application Ser. No. 019,926 (now U.S. Pat. No. 4,313,164) on Mar. 12, 1979 and assigned to the assignee of this application. While it is believed that these techniques are suitable in many conductivity situations, it is also believed that they may not be highly accurate in others—e.g., in high conductivity situations or when there is a significant conductivity contrast across a bed boundary. One difficulty particularly relevant to the latter case is that there is no obvious way to combine two different linear filters, one for each conductivity on either side of a boundary, in such a way as to correctly reconstruct the induction response across that boundary. The effect of many boundaries is yet more complicated and potentially more troublesome. One simplified example of nonlinearities in induction logs can be visualized by considering the basic magnetic field which would be established by the transmitting coils of a tool had they been in a vacuum and the degrading of this basic field by the out-of-phase coupling field generated by eddy currents circulating in the formation. It can be observed intuitively that a linear filter could account sufficiently accurately for the coupling field within an infinitely homogeneous medium but not for coupling effects which reach across a bed boundary.

The invention herein provides a process which remains linear and yet can account for nonlinear couplings across bed boundaries, and can do this efficiently enough to make its use practical in improving actual logs derived in boreholes having the typical nonlinearities associated therewith. More specifically, the invented process makes use of the discovery that a log can be considered as being made of basic building blocks which can be superposed linearly, and that each such basic building block is the log response across a given step from one semi-infinite homogeneous bed to another. In the example of an induction log, one aspect of the discovery is that the tool response when moved across a boundary between a first bed having a first conductivity and a second bed having a second conductivity can be derived by superposing (i) the tool responses when the tool is moved from a hypothetical semi-infinite bed having near zero conductivity to a hypothetical semiinfinite layer having the conductivity of the first layer and (ii) the tool response when moved from the hypothetical semi-infinite layer having near zero conductivity to the second layer. An additional aspect, for the same example, is that the conductivity log in a second layer which is a thin bed sandwiched between a first and a third layer can be reconstructed by linearly superposing the responses at the transitions between (i) the first and second layers and (ii) the second and third layers, and removing from the result of this superposition the conductivity of the second layer.

In particular embodiments of the invention, an original log is converted into an improved log which accounts for the coupling across one or more bed boundaries in a process involving the following overall steps: finding, for example from the original induction log, a provisional layered formation characterized by the depth levels of provisional bed boundaries and provisional characteristics of the respective beds or layers (e.g., the provisional conductivity or resistivity of a layer); deriving a provisional reconstructed log from the provisional layered formation characteristics by superposing step profiles determined by the boundaries and the layer characteristics of the provisional layered formations; matching the original log against the provisional reconstructed log; refining the provisional layered formation on the basis of this; repeating such matching and refining until the original log and the most recently improved provisionally reconstructed log match within selected limits; and converting the original log to a corrected, and thereby improved, log on the basis of the finalized layered formation characteristics and/or producing a rectangularized induction log based on said finalized layered formation characteristics.

An improved induction log produced in accordance with the invention tends to have sharper vertical response and tends to have the logged parameter restored closer to its true level at least in thinner beds as compared with the original log. For example, the vertical resolution of induction logs tends to be improved to approximate that of other logs, such as those tradenamed Laterologs by the assignee of this application, so that better depth alignment can be made between the improved induction logs and other logs which have an inherently higher initial resolution. As another nonlimiting example, induction logs improved in accordance with the invention avoid difficulties ensuing when inaccurate induction logs are used to find hydrocarbon saturation on the basis of which reserves are estimated—possibly with large errors especially for thin hydrocarbon beds. In the case of a Laterolog, which starts out with adequate vertical resolution and is improved in accordance with a modification of the above process, the improvement is mainly in the response to beds which are next to, or squeezed between, other beds of greatly different resistivity. Yet another modification of the above process relates to improving an induction log by building the initial provisional layered formation characteristic on the basis of a Laterolog of the same subsurface formations.

BRIEF DESCRIPTION OF THE DRAWINGS

FIG. 1 is a schematic illustration of a logging tool suspended in a borehole and a system for utilizing logs produced therefrom in accordance with the invention.

FIG. 6 is a detailed flowchart relevant to another step of the process of FIG. 3.

FIG. 7 illustrates a conductivity log step profile response.

FIGS. 8a, 8b, 8c and 8d illustrate model induction log portions useful in explaining superposition of step profile responses.

FIG. 10 is a detailed flowchart of another step of the process of FIG. 3.

FIG. 11 illustrates a model resistivity log for a bed of low resistivity squeezed between two shoulder beds of high resistivity.

FIG. 12 is a flowchart of a process using a LATEROLOG to select the initial provisional bed boundaries in a process for impoving an induction log in accordance with an aspect of the invention.

DETAILED DESCRIPTION

Figure 2A:
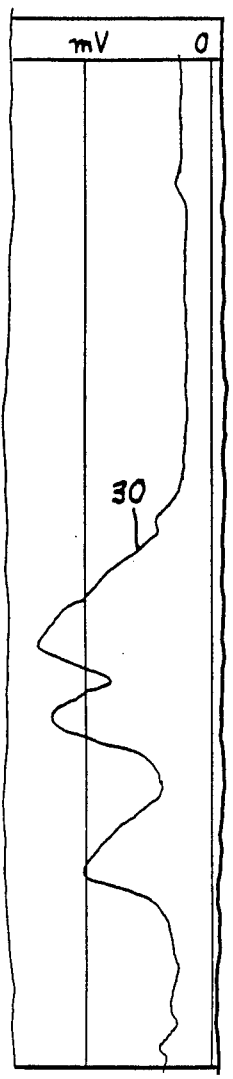
FIGS. 2a, 2b, 2c and 2d illustrate log traces useful in explaining the invention.

FIG. 1 shows an investigating tool 10 in a borehole 11 for investigating subsurface earth formations 12 by deriving one or more logs thereof. In a particular embodiment, tool 10 logs the conductivity or resistivity of the formation, and particular examples of such tools induction log tools and tools used under the tradenames names LATEROLOG and DUAL INDUCTION-LATEROLOG by the assignee of this application. Tool 10 is supported in borehole 11 by a cable 13 which passes over a sheave wheel 14 and is secured to a drum-and-winch mechanism 15. Mechanism 15 includes a suitable brush and slipring arrangement 16 for providing electrical connections between conductors within cable 13 and a unit 17 labelled, SU which controls the supply of power and control signals to tool 10 via cable 13, and additionally includes suitable electronic circuitry for receiving well logging measurements from tool 10 and readying them for application to storage 18. Either or both of unit 17 and/or storage 18 can include equipment for converting analog signals received from tool 10 into digital signals associated with the respective depth levels z in borehole 11 at which the analog signals have been derived by tool 10, as indicated by wheel 19 which engages cable 13 and is linked with a depth recorder 20, which in turn is linked with either or both of unit 17 and storage 18. Either or both of unit 17 and storage 18 can include additional equipment for preprocessing of logs to prepare them for use in the invented process. Storage 18 can store logs derived by separate measuring devices carried by the same tool 10 in one or more passes through borehole 11, logs derived from separate passes of different tools 10 through borehole 11, and/or logs derived from passes of tool 10 or other similar tools through different boreholes in the same or similar subsurface formations. A selected set of one or more of the logs in storage 18 is used in a unit 22 to derive the characteristic of a provisional layered formation, and this provisional layered formation is used in unit 24 to finalize the layering characteristics by refining the provisional layering so that a reconstructed log derived therefrom agrees to within selected criteria with an actual log taken in borehole 11. The finalized layering is used in unit 26 to derive corrected logs based thereon and to store and produce a tangible record of the corrected log or logs and/or the finalized layered formation characteristics.

Figure 2B:
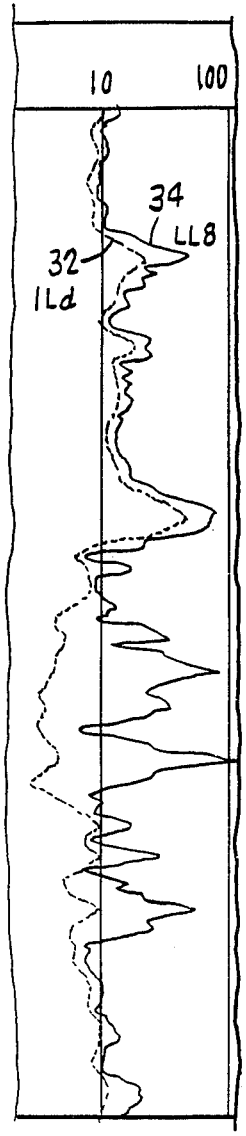

As an example, FIG. 2a shows a spontaneous potential log trace 30 taken in a given borehole depth interval and FIG. 2b shows a deep induction log trace 32 and a trace 34 which is LATEROLOG tradenamed LL8 by the assignee of this application. The logs having traces 32 and 34 have been taken in the same borehole interval with a DUAL INDUCTION-LATEROLOG tool. The logged interval includes a series of tight and permeable formations, and it can be seen that the deep induction log in formations A and B does not appear to have a sufficiently accurate response to thin beds, and also does not appear to show sufficient detail in formation C where the LL8 log appears to show much greater detail. The original logs 32 and 34 can be converted, in accordance with the inventions disclosed herein, into improved logs 32' and 34' shown as respective traces in FIG. 2c, where it can be seen that improvements have been made to the response of the deep induction log to thin beds in formations A and B, that the vertical resolution has been improved in formations C, and that the agreement between the deep induction log 32' and the LL8 log 34' in thin beds in formations A and B has been significantly improved. It can also be observed that the agreement in formations D and E has been improved, which should be the case since the spontaneous log trace 30 suggests low permeability in these formations. It can also be observed that the response of the deep induction log trace 32' in the formations indicated to be more permeable by the spontaneous potential log 30 has also been improved.

Figure 2C:
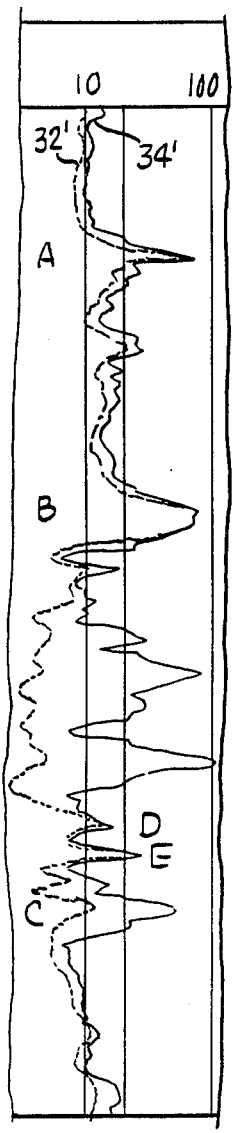
Figure 2D:
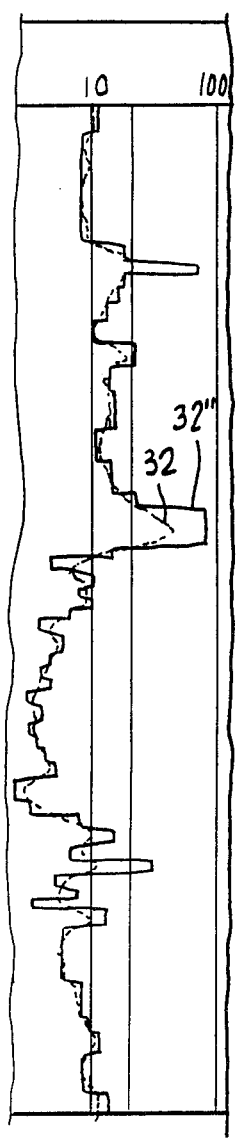

The original logs illustrated in trace form in FIGS. 2a and 2b can be stored in storage 18 of FIG. 1, and the improved corrected logs of FIG. 2c can be stored or recorded in unit 26 of FIG. 1. FIG. 2d illustrates a trace of the original deep induction log 32 in conjunction with a trace of the finalized layered formation log 32" derived therefrom by units 22 and 24 in FIG. 1 and presented in the form of a rectangularized induction log, i.e., a log having a respective constant measurement level between any pair of bed boundaries.

Figure 3:
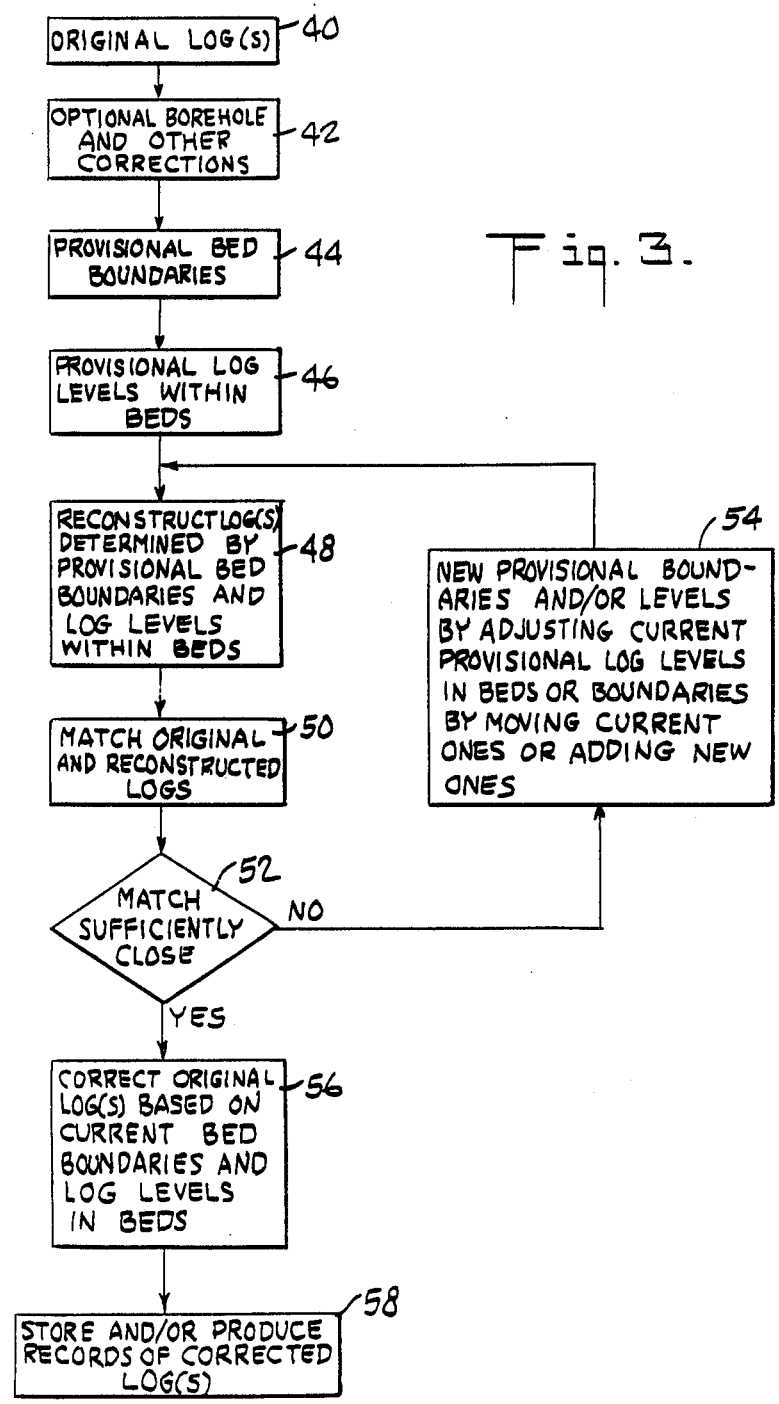
FIG. 3 is a generalized flowchart of steps used in practicing an embodiment of the invention.
Figure 4:
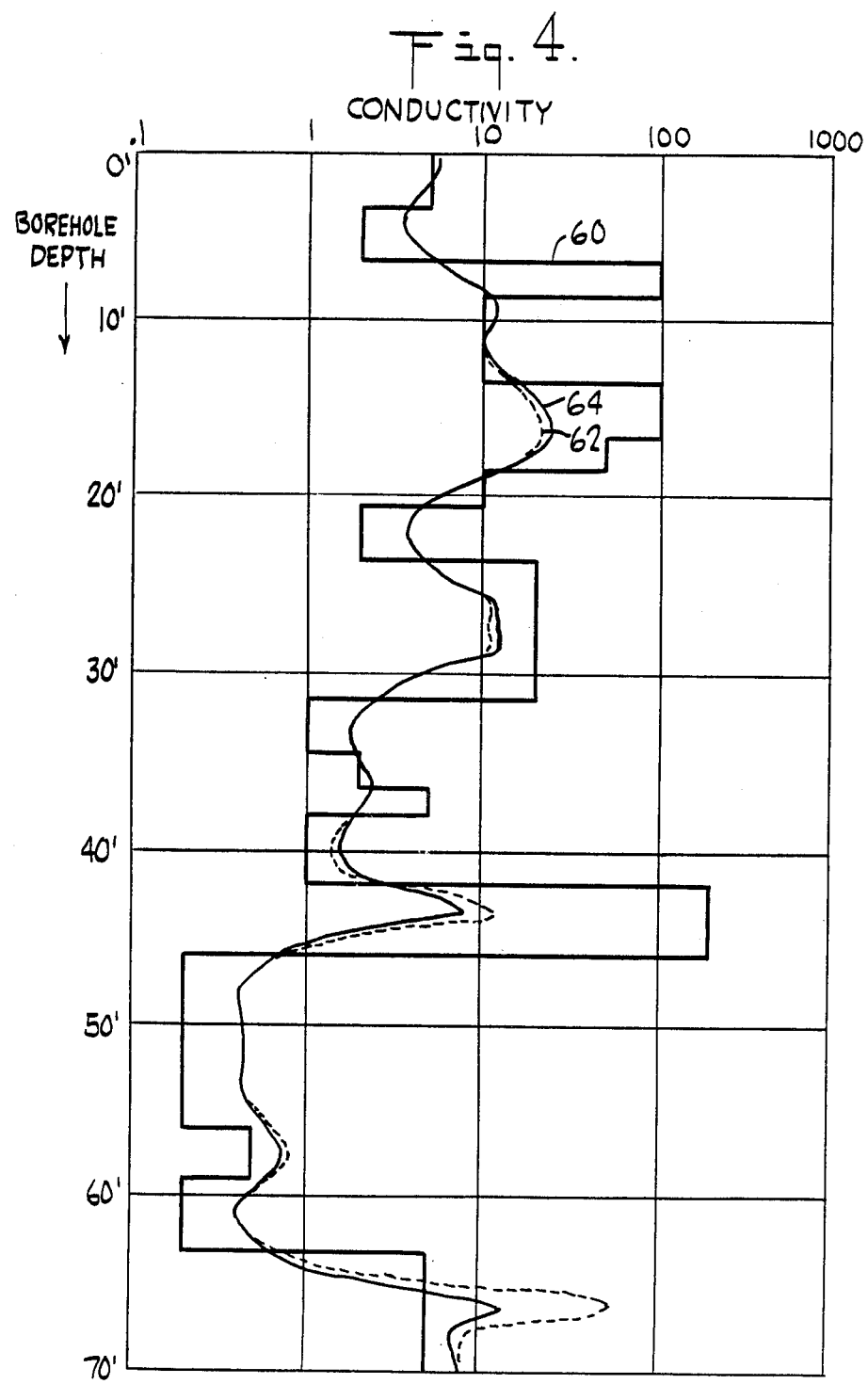
FIG. 4 is an illustration of log traces useful in explaining an aspect of the invention.

The major steps of an exemplary embodiment of the invented process and modifications thereof disclosed herein are illustrated in qualitative terms in FIG. 3, and start with one or more original logs at step 40. An example of such original logs is illustrated at traces 32 and 34 in FIG. 2b. At step 42 some corrections can be made in the original logs, such as removal of the borehole effect, and steps 44 and 46 derive from a selected original log the characteristics of a provisional layered formation. Specifically, step 44 derives, on the basis of an original log, provisional bed boundaries of a layered formation, and step 46 derives respective provisional log levels within the respective beds or layers of that formation. Referring to FIG. 4 for an illustration, a layered formation is illustrated by trace 60 and comprises a number of beds, each having its respective constant log level, with each pair of depth-adjacent beds being separated by a bed boundary which is at a respective depth level in the borehole. At step 48 a reconstructed log is produced on the basis of the provisional bed boundaries and provisional log levels within beds by making use of the discovery that step responses of logs can be linearly superposed in accordance with the invention and modification thereof disclosed herein. Referring to FIG. 4 for an illustration, trace 62 illustrates the theoretical response of an idealized induction logging tool under idealized conditions to a layered formation defined by trace 60, and trace 64 illustrates a reconstructed log which is determined by the bed boundaries and log levels within the beds illustrated by trace 60 and which is derived with the use of the superposition of step profiles discoveries discussed in greater detail below. At step 50 the original and reconstructed logs are matched so that a determination can be made at step 52 if the match is sufficiently close. If it is not, new provisional bed boundaries and/or log levels within beds are derived by adjusting the current provisional log levels in beds and/or by adjusting boundaries (e.g., by moving boundaries and/or adding new boundaries), and the process returns to step 48 to reconstruct another provisional log, this time based on the new provisional bed boundaries and log levels within beds found at step 54. When the match between the original and most recent reconstructed log is sufficiently close, step 56 corrects the original log based on the current bed boundaries and log levels in beds, and step 58 stores and/or otherwise produces suitable tangible records of the corrected log and/or the layered formation characteristics and/or makes use of the corrected and thereby improved logs or layered formation to combine logs in an effort to derive and map yet more useful parameters of the logged formation and thereby assist in the search for and exploitation of underground resources.

Figure 5:
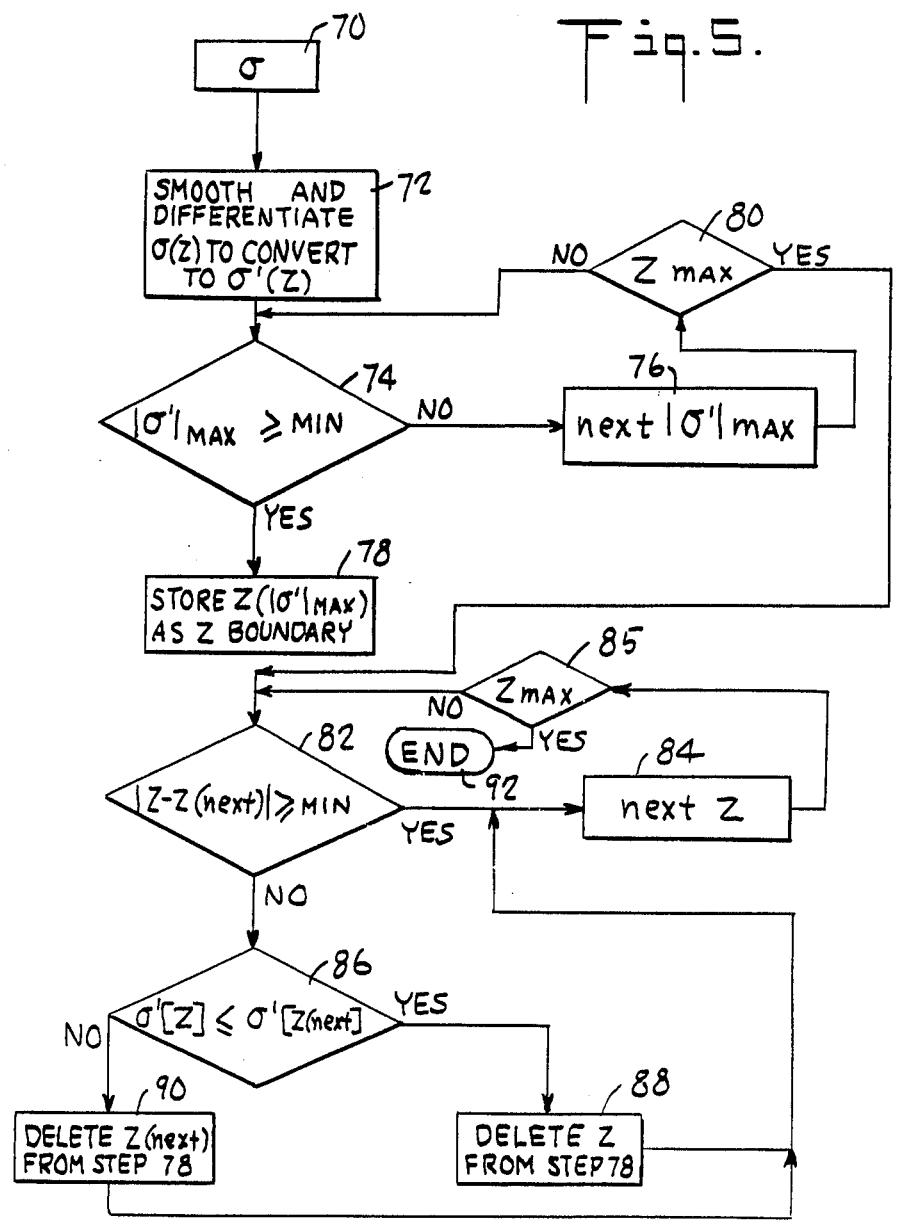
FIG. 5 is a detailed flowchart relevant to a step of the process of FIG. 3.

An exemplary procedure for finding provisional bed boundaries (step 44 in FIG. 3) is illustrated in FIG. 5 and starts at step 70 with an induction log $\sigma(z)$ made up of conductivity measurements such as those making up the deep induction log illustrated at 32 in FIG. 2b. The log comprises a respective conductivity measurement $\sigma$ for each respective depth level z in a borehole depth interval of interest, as for example an induction log stored in storage 18 (FIG. 1). At step 72 the log is smoothed and differentiated to convert it to a log designated $\sigma'(z)$. The purpose of differentiation is to convert the inflection points on the original log into extrema (maxima or minima) on the differentiated log, and the purpose of smoothing prior to differentiation is to suppress insignificant inflections of the original log so that bed boundaries can be identified at more significant inflections of the original log. One example of smoothing is to replace each given measurement $\sigma(z)$ with the sum of one-half $\sigma(z)$ and one-quarter each of the measurements immediately above and below. At step 74 the first (i.e., closest to the borehole bottom) extrema of the log $\sigma'(z)$ is found by identifying the level of log $\sigma'(z)$ at the first peak or valley thereof, and this level is compared with a minimum level to check for inflection points associated with weak boundaries, on the recognition that a weak boundary exists where the ratio between the conductivities of the two flanking beds is too low. The minimum level MIN can be selected such that 25% of all peaks of $|\sigma'(z)|$ are less than MIN, and are therefore not selected as provisional boundaries. If the test at step 74 yields a negative result, the next extrema of the differentiated log is identified at step 76, and—if a test at step 80 shows that the process is still within the borehole depth interval of interest—another test is run at step 74, using this newly identified extrema. A positive result from step 74 means that the absolute value of the maximum level under consideration can be associated provisionally with a boundary, and the depth level in the borehole of this provisional boundary is stored at step 78. All extrema on the differentiated conductivity log are similarly tested at step 74 and, when the test at step 80 indicates that the process has already checked the entire borehole depth interval of interest, a test is run at step 82, starting with the depth levels of the two lowermost provisional boundaries in the borehole, to determine if the boundaries flank a bed of sufficient vertical extent, for example two feet or more. This is done by a determining if the depth difference between two adjacent boundaries is at least equal to a selected threshold. If the vertical extent threshold for a bed is satisfied, the process moves one boundary level up in the borehole at step 84, and checks at step 85 if the borehole depth interval of interest has been exhausted, and—if the answer is negative—returns to step 82 to test the new pair of boundaries. When the provisional boundaries tested at step 82 are found to be too close to each other, this means that one of the two boundaries tested at 82 should be deleted, and step 86 is a test to determine which is a weaker one, i.e., which is a boundary between beds whose conductivity ratio is less than that of the beds separated by the other provisional boundary. As a result of the test at step 86, either step 88 deletes the lower boundary from the set of boundaries stored at step 98 or step 90 deletes the upper boundary from the set stored at step 78.

Thus, at the conclusion of the process illustrated in FIG. 5, i.e., when the test at step 85 gives a positive result, step 78 has stored the depth levels of provisional boundaries which define beds whose thickness is at least a minimum, e.g., two feet.

As an alternative to the process discussed in connection with steps 82-90, and assuming that the minimum acceptable thickness is N samples (e.g., samples taken every six inches up the borehole), a first step can suppress boundaries leading to beds thinner than N−1 samples and the remaining boundaries can be shifted, one at a time, by one sample depth level and then again boundaries leading to beds thinner than N−1 samples can be eliminated.

One example of a process for finding provisional log levels within beds (step 46 of FIG. 3) is illustrated at FIG. 6, and starts at step 92 with the conductivity log $\sigma(z)$ discussed in connection with FIG. 5 and the depth levels z(boundary) of bed boundaries, for example as found by the process of FIG. 5. At step 93 the first bed (the lowermost bed in the borehole interval under consideration) is selected and at step 94 a test is made to determine the shape of the variation in conductivity in that bed, i.e., the variation of conductivity at depth levels z which are in bed i. If the shape generally conforms to a peak, a provisional constant conductivity level for that bed is set at step 95a to be equal to the maximum conductivity found in the bed; if the shape is generally a valley, the bed conductivity level is set at step 95b to the minimum conductivity found in the bed; and if the conductivity variation conforms neither to a peak or to a valley (i.e., typically conforms to a staircase—a gradual increase or a gradual decrease) the constant provisional bed conductivity level is set at step 95c to the average of the conductivity measurements within the bed. The resulting selected bed conductivity level is stored at step 96, the next bed up the borehole is found at step 97, and a test is made at step 98 to determine if the topmost bed in the borehole has been treated. If not, the process returns to step 94 to identify the shape of the next bed up the borehole; otherwise, the process ends.

The result of the process discussed in connection with FIGS. 5 and 6, is a provisional layered formation characterized by the depth levels of the provisional boundaries between adjacent provisional beds and by the respective provisional conductivity levels within the respective beds. Accordingly, the process can now enter step 48 of FIG. 3 for the purpose of reconstructing an induction log determined by a set of provisional bed boundaries and provisional log levels within boundaries, for example as found in FIGS. 5 and 6.

It should be possible to do an exact reconstruction of a conductivity log measurement at a given depth level in a known, relatively uncomplicated layered formation for a logging tool tool having known characteristics, for example by using wave theory (Maxwell's equations), the physical parameters of the tool transmitter and receiver coils, etc. It is believed, however, that such reconstruction if done with adequate accuracy would require such inordinate processing that it would be impractical in well logging.

It has been discovered, however, as a part of the invention, that if the tool response is known in the case of transitions from a first semi-infinite first layer having near zero conductivity to a second semi-infinite layer for each of a range of conductivities of the second layer typically encountered in well logging, then the response of the tool to any transition from an arbitrary first to an arbitrary second semi-infinite layer can be reconstructed sufficiently accurately through a new process which is both linear and rapid. In this context the term semi-infinite refers to a hypothetical layer which has a constant conductivity level and extends to infinity from the boundary. Stated differently, it has been discovered that the induction log response to a step profile, i.e. the induction log at and around a bed boundary between a first semi-infinite layer having a first arbitrary conductivity and a second semi-infinite layer having a second arbitrary conductivity can be usefully approximated by the superposition of the step profile for a transition from a semi-infinite hypothetical layer having near zero conductivity to a semi-infinite layer having the first conductivity and a step profile for the transition from the hypothetical semi-infinite layer of near zero conductivity to a semi-infinite layer having the second conductivity. In addition, it has been discovered as a part of this invention that the induction log response to a thin bed of conductivity $\sigma 2$ sandwiched between a first semi-infinite layer of conductivity $\sigma 1$ and a second semi-infinite layer of conductivity $\sigma 3$ can be usefully approximated by: (a) superposing the induction log responses to the transitions between (i) two semi-infinite layers of conductivities $\sigma 1$ and $\sigma 2$ having a boundary coinciding with that between the first layer and the bed and (ii) another pair of semi-infinite layers having conductivities $\sigma 2$ and $\sigma 3$, with the boundary therebetween coinciding with the boundary between the bed and the second layer; and (b) removing the conductivity level $\sigma 2$ of the bed from the superposition of the two step profile responses.

To illustrate the first discovery, an induction log response to a step profile involving two semi-infinite layers of true conductivities of 5,000 and 1,000 mmhos is shown in FIG. 7 and comprises a straight line portion which intersects the boundary separating the layers, a horn on each side of the boundary and a tail following each horn. In accordance with this aspect of the invention, the induction log response to a step profile transition between two semi-infinite layers, i.e. the apparent conductivity which should be measured by an induction tool at a depth point a given distance away from the boundary, is assumed to be a function of the conductivities on the two sides of the boundary and the distance (and direction of distance) between the depth level of interest and the boundary. Then, curves such as the one illustrated in FIG. 7 can be derived for the entire range of conductivities expected to be encountered in induction logging on the basis of the physical characteristics of the transmitter and receiver coils and wave theory relationships. Alternately, curves such as the one illustrated in FIG. 7 can be derived empirically for the expected range of conductivities by running an induction tool through laboratory formations approximating two semi-infinite layers of appropriate conductivities. Alternately, step profile response curves such as that shown in FIG. 7 can be derived for step profiles from near zero conductivity and conductivities in the range expected in actual logging, and those curves can be superposed as needed to derive step profile responses for transitions from one arbitrary conductivity level to another.

One aspect of the discovery that the induction log response for the case of a thin bed sandwiched between a first and a second semi-infinite layer can be approximated by the superposition of two responses to transitions between semi-infinite layers minus the conductivity level of the bed can be observed in FIGS. 8a, b, c and d. FIG. 8a illustrates a layered formation consisting of a bed of conductivity $\sigma 2$ sandwiched between a semi-infinite layer of conductivity $\sigma$ and a semi-infinite layer of conductivilayer of conductivity $\sigma 3$. FIG. 8b illustrates a formation comprising a transition between a semi-infinite layer of conductivity $\sigma 2$ equal to that of the bed and a conductivity $\sigma 3$ equal to that of the semi-infinite layer below the bed, and FIG. 8c illustrates a transition between a semi-infinite bed of conductivity $\sigma 1$ and a semi-infinite bed of conductivity $\sigma 2$ equal to that of the bed. FIG. 8d illustrates in solid lines the conductivity curve resulting from superposing (adding) the conductivity curves of FIGS. 8b and 8c, and shows in broken lines the conductivity curve resulting from subtracting, from the superposition curve, the conductivity level of the bed. It is seen that the broken line curve in FIG. 8d is identical to the conductivity curve in FIG. 8a, which is the desired result. Accordingly, an aspect of the invention disclosed herein is the discovery that the induction log response to a layered formation characterized by conductivities such as illustrated in FIG. 8a can be usefully approximated by the superposition of the induction log responses to step profiles characterized by the conductivity curves of FIGS. 8b and 8c. In the case of a formation comprising layers 1, 2, . . . , i, . . . , n this discovery can be generalized to a statement that the induction log response for the layered formation can be derived by superposing the induction log responses to each transition from layer i to layer i+1 for the range of i from 1 to n−1 and subtracting from this superposition the conductivity level of each layer in the range of from i=2 to i=n−1. Stated in terms of an expression, an induction log reconstructed in accordance with this discovery, can be derived as follows, where $S(\sigma i, \sigma i+1)$, designates the induction log response across a boundary separating two layers of respective conductivities $\sigma_i$ and $\sigma_{i+1}$ $$\text{reconstructed induction log} = \sum_{i=1}^{n-1} S(\sigma_i + \sigma_{i+1}) - \sum_{i=2}^{n-1} \sigma_i \quad (1)$$

Figure 9:
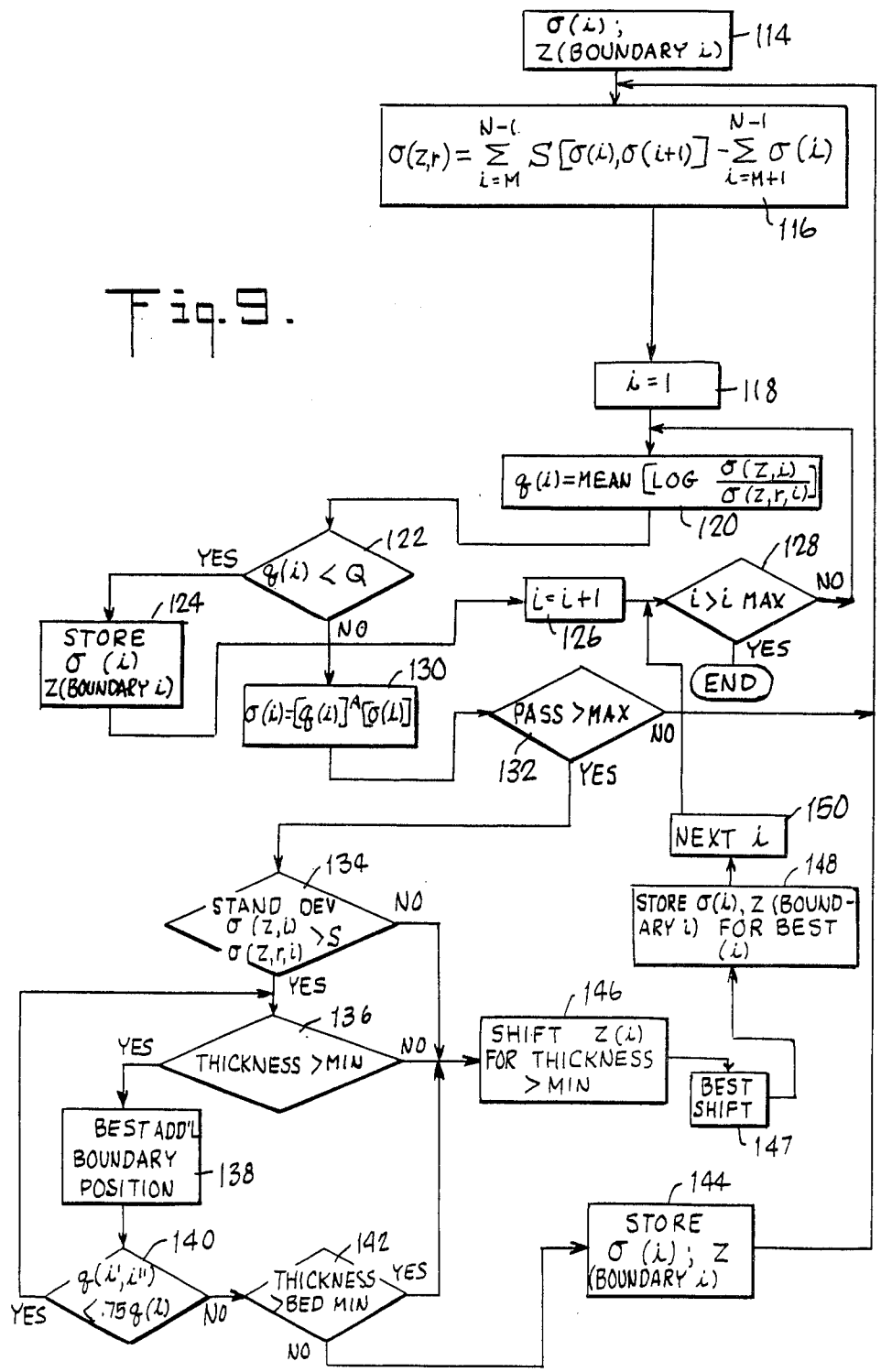
FIG. 9 is a detailed flowchart of a step of the process of FIG. 3.

The discoveries discussed above are used to produce a reconstructed log on the basis of a layered formation characterized by bed boundaries and bed conductivities in a process illustrated in flow chart format in FIG. 9. The process starts at step 114 with the borehole depths z(boundary i) of the provisional bed boundaries found by the process discussed in connection with FIG. 5 and the provisional bed conductivity levels $\sigma(i)$ found by therocess discussed in connection with FIG. 6. At step 116 a reconstructed log $\sigma(r)$ is produced therefrom using the superposition of step profiles in accordance with the procedure discussed in connection with expression (1) above. Specifically, the procedure at step 116 uses the known and prestored step profile responses S (e.g., as in FIG. 7) appropriate to the transition between conductivities $\sigma(i)$ and $\sigma(i+1)$ as needed in the process, based on the current provisional bed boundary z(boundary i) and bed conductivity levels $\sigma(i)$ and $\sigma(i+1)$ to derive therefrom, on the basis of the superposition of step profiles discovery and using the relationship indicated at step 116, a provisional reconstructed induction log $\sigma(r)$ which comprises a reconstructed conductivity measurement for each depth level z in the borehole for which an original conductivity log measurement was taken with the induction tool. However, rather than using all beds to find the reconstructed log measurement $\sigma(z,r)$ at a given borehole depth z, the invention makes use of the recognitions that the skin depth effect is such that beds more than a certain distance from depth level z would not contribute significantly to $\sigma(z,r)$, and that $\sigma(z,r)$ can be found sufficiently accurately without considering such remote beds (e.g., beds more than 50' from z in the case of an induction log and more than 10' in the case of the Laterolog). Accordingly, rather than relying on the generalized expression (1), the process uses at step 116 a summation which, for a given $\sigma(z,r)$, starts at the bed having a boundary i=M which is just inside the skin effect limit (e.g., 50' for $\sigma$ and 10' for R), and goes to N−1, where N is the bed having a boundary up from z just inside the skin depth limit.

Once the current provisional reconstructed induction log is available through the procedure at step 116, the index i is set to one at step 118 to point to the lowermost provisional bed in the borehole, and at step 120 a quality factor q(i) is found for the current bed as the mean of the logarithm, for each respective depth level z within the provisional bed i under consideration, of the ratio of the respective original induction log measurement $\sigma(z,i)$, as measured by the tool at the respective depth level, and the reconstructed induction log measurements $\sigma(z,r,i)$ for the same depth level. Each quality measure found at step 120 for the current bed of interest is tested at step 122 to determine if it is within a selected criterion designated Q. For example, Q can be selected such that the test would be satisfied if the average of the reconstructed log measurements $\sigma(r,z,i)$ in bed i differs from the current provisional bed conductivity $\sigma(i)$ by less than 10% of $\sigma(i)$. A positive result indicates that there is a satisfactory match between the original induction log taken in the provisional bed under consideration and the log for the same bed reconstructed at step 116 and, accordingly, the satisfactory conductivity level and boundaries of the provisional bed are stored at step 124, the index i is incremented at step 126 to point to the next provisional bed up the borehole, a test is made at step 128 to determine if the borehole limits of interest have been exceeded and, if the answer is in the negative, the process returns to step 120 to find the relevant quality factor for the new provisional bed. A negative response at step 122 indicates that there is excessive mismatch between the original and the reconstructed log in the provisional bed under consideration and, accordingly, at step 130 the provisional constant conductivity level $\sigma(i)$ within the current provisional bed (i) are adjusted: for example by multiplying the current bed conductivity level $\sigma(i)$ by the quality factor for the bed raised to the power A (e.g., to the power 1.1). A test is then made at step 132 to determine if the current bed of interest has passed through step 132 too many times and, if the answer is in the negative, the process returns to step 116, to start finding the reconstructed log $\sigma(z,r)$, this time on the basis of the bed conductivities which include the refined one found at step 130. Too many passes through step 132 (e.g., more than 20 passes) indicate the probability of poorly chosen boundaries and, accordingly, an affirmative result at step 132 leads to a process, starting at step 134, which adjusts bed boundaries rather than bed conductivity levels. Step 134 is a test to determine if the standard deviation of the ratios $\sigma(z,i)/\sigma(r,z,i)$ found at step 120 for respective depth levels z in the provisional bed of interest exceeds a selected criterion, e.g. 10%. An affirmative answer indicates that the adjustment or refinement should be by adding a bed boundary within the bed rather than shifting the original bed boundaries and, accordingly, at step 136 a test is made to determine if the current bed is sufficiently thick to allow for the addition of another provisional boundary therein (e.g., by testing if the depth extent of the current provisional bed exceeds a certain minimum, for example four feet). If the test at step 136 determines that the provisional bed under consideration is thick enough, the best position for an additional boundary is selected at step 138, for example by inserting a test boundary at each of the possible positions which do not lead to beds thicker than a minimum of, say, two feet and selecting the boundary position which leads to best quality factor of the type discussed in connection with the procedure commencing with step 122. In the alternative, step 138 can be carried out by inserting a new boundary at each of the possible positions therefor, finding the conductivities of the two new beds for each such position (e.g., per FIG. 6), applying a linear filter thereto to find a reconstructed log, and choosing the boundary position for which a test such as in step 120 gives the best (lowest) quality factors. The quality of each of the two newly created beds i' and i" is tested at step 140 to determine if the quality factor for each is a significant improvement over the quality factor for the old bed which was divided into the two new beds, for example to determine if each new quality factor is less than 75% of the old one. A positive result at step 140 means that the division of the old bed into two new ones was enough of an improvement, and the process returns to step 136, this time testing each of the two new beds to determine if any of them can be divided into two yet additional new beds which would be an improvement. A negative result at step 140 indicates that no further improvement is possible by adding a boundary, and a test is made at step 142 to determine if any of the new beds is thicker than the minimum permissible thickness for a bed, for example two feet. A negative result indicates that the bed cannot be further improved by shifting its boundaries to make it thinner, and therefore its most recently established boundaries and conductivity level are stored at step 144, where they are merged with the set of provisional bed conductivities and boundaries stored at step 124, and the process returns to step 116, to find a new reconstructed log using the new bed boundaries and conductivities. A positive result at step 142 indicates that it is possible to shift bed boundaries and, at step 146 each boundary of the current provisional bed under consideration is shifted, one boundary and one borehole depth level at a time, for as long as the two beds adjacent the shifted boundariey retain a thickness of at least the minimum (of two feet, for example,) and at step 147 the quality factors of the beds on the two sides of the so shifted boundary are compared with the respective quality factors for all other positions of the same boundary to select the boundary position giving best bed qualities. The so selected best boundary position and the conductivity levels for the two beds flanking it are stored at step 148, where they are merged with the set of provisional bed boundaries and conductivity levels stored at steps 124 and 144, and the process returns to step 116, to find a new reconstructed log using all the newly found bed boundaries and conductivities. The process ends when the test at step 128 determines that all provisional bed boundaries and bed conductivity levels have been treated as discussed. At this time, parameters stored at steps 124, 144 and 148 amount to a set of finalized and refined provisional bed boundaries and provisional bed conductivities characterizing a layered formation model which best matches the original induction log taken in the borehole. This layered model can be used as the basis for an improved rectangularized induction log (e.g., 34" in FIG. 2d), or it can be used to sharpen the vertical resolution of the original induction log taken in the borehole depth interval of interest and to correct this original log for the influence on a measurement taken within a given bed of beds across bed boundaries surrounding this given bed.

A process for using the finalized provisional bed boundaries and bed conductivities refined in the process discussed in connection with FIG. 9 can be used to correct the original induction log as shown in FIG. 10. The process begins at step 152 with the finalized provisional bed boundaries refined through the process discussed in connection with FIG. 9. At step 154 the index i is set to point to the bed lowermost in the borehole, and at step 156 a test similar to that discussed in connection with step 94 in FIG. 6 is made to determine the nature of the variation of the original induction log measurements within the current finalized bed under consideration. If the variation generally conforms to a peak the bed conductivity of the finalized layered formation is set at step 158 to the maximum induction log measurement taken at that bed; if it conforms to a valley the bed conductivity level in the finalized bed is set at step 160 to the minimum induction log measurement in the bed; and otherwise it is set at step 162 to the average of the induction log measurements in the finalized bed under consideration. The index i is incremented at step 162 to point to the next finalized bed up the borehole, a test is made at step 164 to determine if the index still points to a bed within the borehole interval of interest and, if so, the process returns to step 156. When the test at step 164 determiness that all of the finalized beds of the layered formation have been treated, the process goes to step 166 in which the superposition of step profile responses discussed above in connection with step 116 in FIG. 9 is utilized to produce a new reconstructed induction log based on the finalized bed boundaries and bed conductivities of the layered formation. A correction factor CF(z) is then derived for each depth level z in the borehole as the ratio between the conductivity level for the bed of the layered formation which includes the depth level of interest and the reconstructed log measurement for the same depth level of interest. This correction factor is used at step 170 to produce a corrected log measurement for the depth level of interest as a function of the correction factor found for that depth level at step 168 and the original induction log measurement for that depth level. For example, the original induction log measurement for the depth level of interest can be weighted by the correction factor found for that borehole depth level at step 168. To accommodate the special situation at a boundary of the layered formation, the weighting of the original induction log measurement at the depth level of the boundary can be by an interpolated correction factor based on the correction factor found at step 168 for the depth level for the boundary and each of the correction factor found for the sides thereof. The so corrected original induction log measurements are stored and/or plotted at step 172 and/or the most recent reconstructed induction log and provisional bed boundaries are stored and/or plotted at the same step, for example to produce a corrected induction log of the type illustrated at trace 32 in FIG. 2d and/or the most recent layered formation bed boundaries and bed conductivities are plotted as an improved rectangularized induction log, e.g., as illustrated at 32" in FIG. 2d, and/or a different tangible representation of logs such as 32 and 32" in FIG. 2d is produced.

An additional discovery, on which another aspect of the inventions disclosed herein is based, is the effect on a LATEROLOG resistivity measurement, taken at a given depth level, of beds across one or more boundaries from the bed in which the given depth level is located. It has been discovered that while the general principles of the superposition of step profile response as discussed above can give useful results in many cases, this may not hold accurately enough in some special situations, such as in severe squeeze in which a bed of low resistivity is between two beds of much higher resistivities and, to a certain extent, in anti-squeeze in which a bed of high resistivity is between two beds of much lower resistivities. One possibly significant reason is that in LATEROLOG, tools, in which a sheet of current of finite vertical extent is sent laterally in the formation, subsurface layers arranged in a squeeze arrangement tend to shrink the vertical extent of that sheet of current while an anti-squeeze arrangement tends to increase the vertical extent of that sheet. In connection with this, it has been discovered that while the fundamentals of the superposition discovery discussed above can still be utilized, the superposition can be made yet more useful by adjusting the step profile responses so as to force an exactly correct reconstruction at the center of a thin bed. Referring to FIG. 11, which shows a LATEROLOG resistivity curve for a squeeze arrangement involving shoulder beds of resistivities R1 and R3 respectively, and a squeezed bed of resistivity R2, the step profile responses to the boundaries at the transitions from R1 and R2 and from R2 to R3 are so adjusted that when superposed they will give an exact reconstructed measurement value for the indicated midpoint between the two boundaries. As in the case discussed above of induction log step profile responses, the LATEROLOG resistivity responses for the range of steps in resistivity expected to be encountered in logging of actual boreholes can be found on the basis of the known physical characteristics of a given LATEROLOG tool, knowledge of the relevant subsurface formations and of the propagation of current therein, or they can be derived empirically in laboratory models of formations having known resistivities. A reconstructed LATEROLOG can then be derived by superposition similar to that discussed above in the case of the induction log, except that this time each step profile response is the modified or pseudo-step response which forces an exact reconstruction at the center of a thin bed and except that LATEROLOG resistivity measurements are used rather than induction log conductivity measurements. Expression (2) below is a shorthand notation for the reconstructed Laterolog derived by superposing the modified or pseudo-step profile responses and, except for the fact that pseudo-step profile responses S' and resistivity measurements R are used, corresponds to the procedure discussed in connection with expression (1) above for the induction log case:

$$\sum_{i=1}^{n-1} S'[R(i), R(i + 1)] - \sum_{i=2}^{n-1} R(i) \quad (2)$$

Thus, what is found and stored for the LATEROLOG is the equivalent of curves similar to that for the induction log case illustrated in FIG. 7, but adjusted to give an exact response at the midpoint of a bed and, of course, expressed in terms of LATEROLOG resistivity rather than induction log conductivity measurements. Once these curves are available, provisional layered formation characteristics based on the LATEROLOG can be found and refined and finalized as discussed in connection with FIGS. 5 and 9, of course working with LATEROLOG resistivity measurements rather than conductivity measurements, and the finalized layered formation characteristics can be used to correct the original LATEROLOG measurements in accordance therewith as discussed in connection with FIG. 10 for conductivity measurements, and the resulting improved LATEROLOG measurements and/or the layered formation characteristics on which they are based can be stored and/or plotted as discussed in connection with step 172 in FIG. 10 in connection with induction log conductivity measurements.

It has been discovered in connection with LATEROLOG tools that the measurements for the deep LATEROLOG response reconstructed as discussed above on the basis of pseudo-step profile responses tend to be significantly affected by the characteristic of subsurface formations which are up to about 50 feet from the depth level of the reconstructed resistivity measurement of interest, and that in the case of the shallow LATEROLOG reconstruction, the distance is only about 10 feet. Accordingly, the superposition at step 116 of FIG. 9 and at step 166 in FIG. 10 need take into account only pseudostep profile responses for boundaries within 50 feet of the depth level of the resconsturcted LATEROLOG measurement of interest and only within 10 feet of the depth level of the reconstructed shallow measurement of interest.

It has been discovered additionally that the correction of the induction log on the basis of the superposition of step profile responses discussed above can be significantly improved by two modifications: (i) deriving the initial set of provisional induction log bed boundaries and bed conductivities on the basis of the shallow LATEROLOG rather than on the basis of the original induction log taken in the borehole by an induction tool; and (ii) using the superposition of pseudo-step profile responses for the induction log similar to those discussed above in connection with the LATEROLOG resistivity measurements rather than superposition of the step profile responses discussed earlier in connection with the induction log. Referring to FIG. 12 for a flow chart of a process based on these additional discoveries, step 180 starts with an original induction log comprising conductivity measurements $\sigma(z)$ for the respective depth levels z in a borehole depth interval of interest and a LATEROLOG, preferably shallow LATEROLOG resistivity measurements R(z) for the respective depth levels z for the same borehole depth interval. At step 182 initial provisional bed boundaries at respective borehole depth levels Z(i) are chosen on the basis of the LATEROLOG measurements R(Z), for example in accordance with the process discussed in connection with FIG. 5, but using the LATEROLOG resistivity meausrements rather than conductivity measurements, and at step 184 initial provisional bed conductivity levels are selected for the beds defined by the boundaries chosen at step 182, these conductivity levels being based, as discussed in connection with FIG. 6, on the type of variation of the original induction log conductivity measurements within the provisional beds of interest (i.e., those chosen at step 182 on the basis of the LATEROLOG measurements). At step 186 a provisional reconstructed induction log is produced from the layered formation characterized by bed boundaries chosen at step 182 and bed conductivity levels chosen at step 184, and at step 188 the current reconstructed induction log is matched against the original induction log, using a process corresponding to that discussed in connection with FIG. 9. If the match does not yield sufficiently good results, using criteria corresponding to those discussed in connection with FIG. 9, the bed conductivity levels and/or bed boundaries are adjusted at step 190, again using the process discussed in connection with FIG. 9, and the process returns to step 186 to reconstruct another provisional induction log, this time on the basis of the new bed conductivity levels and/or bed boundaries found at step 190. When the test at step 188 determines that there is a sufficiently good match, again on the basis of the principles discussed in connection with FIG. 9, the original induction log is corrected at step 192 on the basis of the most recent layered formation characteristics adjusted at step 190, using the correction process discussed in connection with FIG. 10, and at step 194 the relevant log and/or layered formation characteristics are stored and/or plotted in the manner discussed in connection with step 172 in FIG. 10, step 58 in FIG. 3 and FIG. 2d.

In the case of correcting the induction log starting with initial bed boundaries derived on the basis of the LATEROLOG, the pseudo-step profile response S' of the induction log at the transition from a bed of conductivity level $\sigma(i)$ and a bed of conductivity level $\sigma(i+1)$ can be expressed as follows, where g designates a function of the conductivities on the two sides of the boundary of interest and $\Delta z$ represents the distance between the borehole depth level of the point of interest on the pseudo-step profile response and the borehole depth level of the boundary between the two layers having the relevant conductivities, said pseudolayers step profile response S' being adjusted such that the reconstruction is exact at the center of a bed:

$$S'[\sigma(i), \sigma(i+1)] = [\sigma(i)](g[\sigma(i), \sigma(i+1), \Delta z]) + [\sigma(i+1)](i - g[\sigma(i), \sigma(i+1), \Delta z]) \quad (3)$$

In the case of the deep induction log, which has a symmetrical response, pseudo-step profile response on one side of the boundary is the mirror image of that on the other. The function g varies between one and zero whatever the conductivity levels are of the two layers of interest. If $\Delta z$ is strongly negative (i.e., far up the borehole from the boundary of interest), g tends to approach one; if $\Delta z$ is strongly positive (i.e., far down the borehole from the bed boundary of interest), g tends to approach zero. For quick derivation of the pseudo-step profile response level at any distance from a bed boundary, it can be convenient to store a surface match expression and coefficients approximating the response rather than the complete response point-bypoint and, such a fit to the function g can be represented by the expression (4) below, where the coefficients A through J can be found by surface fitting to the actual response of a given induction tool to a step profile across layers of the relevant conductivities:

$$g[\sigma(i), \sigma(i+1), \Delta z] = A[\sigma(i)]^3 + B[\sigma(i)]^2 \sigma(i+1) + C[\sigma(i)][\sigma(i+1)]^2 + D[\sigma(i+1)]^3 + E[\sigma(i)]^2 + F[\sigma(1)][\sigma(i+1)] + G[\sigma(i+1)]^2 + H[\sigma(i)] + I[\sigma(i+1)] + J \quad (4)$$

When the distance along the borehole between the point on the pseudo step profile response and the depth level of the boundary (i.e., the distance $\Delta z$) becomes very large negatively or positively, it is unnecessary to store all the coefficients in expression (4), and the pseudo-step profile response points at depth levels spaced from the bed boundary by distances exceeding a limit (lim z) on $\Delta z$ can be represented as follows:

$$S' = \sigma(i+1) + S'[\sigma(i), \sigma(i+1)| \lim z - \sigma(i+1)][(\lim z)/(z)] \quad (5)$$

Moreover, it is unnecessary to include in the process discussed in connection with step 116 in FIG. 9 the effect of step profiles far from the depth level under consideration for a reconstructed induction log, based on an estimate of the extent to which the electromagnetic wave transmitted by the coils of induction tool propagates into a medium. This depth extent $\delta$ in feet, from the depth level of interest can be given by the following expression, where $\sigma$ designates the true conductivity in mmhos/m:

$$\delta = 369/\sqrt{\sigma} \quad (6)$$

Generalized to a layered formation, the number of depth boundaries between a given step and a given depth level for the reconstructed induction log is:

$$N\delta = \sum_{i=m}^{n} [t(i)][\sqrt{\sigma(i)}/369] \quad (7)$$

where m through n are intervening beds. Empirical results have shown that an upper limit of n equals 0.3 provides a generally sufficient vertical boundary cover, and that the first two boundaries on either side of the depth level of interest for the reconstructed induction log can always be used irrespective of the skin depth test.

As an addition to the process illustrated in FIG. 9, and for the purpose of accommodating the possibility that a small subset of beds would not improve by changing bed conductivities and/or boundaries as described in connection with FIG. 9, such subset can be detected, for example by checking if the same beds cause a return to step 116 too many times (e.g., more than 20 times), and can be subjected to more specialized treatment. Suppose that a subset composed of beds i, i+1 and i+2 does not appear to improve, and that a change dq(i) in the bed quality factors q(i) is a function of changes $d\sigma(i)$ in the respective bed conductivities $\sigma(i)$ related by a matrix of coefficients which are constants:

|       | $\sigma(i)$ | $\sigma(i+1)$ | $\sigma(i+2)$ | (8) |
|-------|-------------|---------------|---------------|-----|
| q(i)  | A'          | B'            | C             |     |
| q(i+1)| A''         | B''           | C'            |     |
| q(i+2)| A'''        | B'''          | C''           |     |

Stated in matrix notation: $q = J\sigma$, where q is the vector of bed qualities for the relevant subset of beds, J is the Jacobian matrix which maps bed qualities to bed conductivities, and $\sigma$ is the vector of the conductivities of the beds in question. Conversely: $\sigma = J^{-1}q$. In practice, to simplify the use of the relationship, and to prevent divergence in successive passes, the corrections $d\sigma(i)$ are not applied as such, but are reduced by a weighting factor $\sigma$. Thus, a new conductivity $\sigma(i)_{new}$ is found by generating $[\sigma(i)_{old} + \sigma d\sigma(i)]$, where $\sigma$ can be, for example, a damping factor of 0.5. First the main diagonal of the Jacobian matrix is used, and a measure of convergence (or divergence) t is found on the basis of $$t = \sum_{i=1}^{m} [d\sigma(i)]^2/m.$$

where m is the number of beds in the local subset which is being treated. If t decreases, the process continues; if t begins to increase, the two flanking diagonals of the Jacobian matrix are added to take into account the effect on one bed of the log responses in its immediate neighbors. Again the convergence (or divergence) test is monitored, and if t increases again, another pair of diagonals is added. This continues until all the beds in the subset achieve satisfactory quality, using the tests discussed in connection with FIG. 9, or if another pair of diagonals has been added and the system begins to diverge for the third time. After all local subsets of this type are treated in this manner, the entire sequence of beds is once more subjected to the main diagonal of the Jacobian matrix, for the purpose of eliminating end effects caused by the influence of subsets outside the main sequence.

In summary, in one exemplary embodiment an original induction log is derived on the basis of the output produced by an induction tool passed through a borehole intersecting earth formations. Provisional bed boundary depth levels are found from the same log, or from another (resistivity) log, and provisional bed conductivities are found on the basis of said provisional boundaries and said original log. A provisional reconstructed induction log is found from said provisional boundary depth levels and bed conductivities, by linearly superposing respective known step profile responses of the induction tool to conductivity step profiles consistent with respective ones of said provisional boundaries and bed conductivities. The original induction log and the reconstructed log are repeatedly matched and the provisional bed conductivities and/or bed boundaries are repeatedly refined on the basis of such matching until the match based on the most recent refinement meets selected criteria. As an end result, a tangible representation is produced of an improved induction log based on the most recent set of refined bed boundaries and bed conductivities. The steps summarized immediately above for an induction log can be applied to the resistivity log as well.

I claim:

1. A well logging process comprising the following machine-implemented steps:
    deriving an original resistivity log produced by a resistivity tool passed through a borehole and exploring same with a sheet of current sent into the adjacent formation laterally of the borehole;
    finding, from said resistivity log, provisional bed boundary depth levels and bed resistivities of a provisional layered formation traversed by the borehole, said provisional bed boundaries and bed resistivities defining a provisional layered formation traversed by the borehole;
    producing, from said provisional boundary depth levels and bed resistivities, a provisional reconstructed resistivity log by linearly superposing respective known step profile responses of the tool to resistivity step profiles consistent with respective ones of said provisional boundaries and bed conductivities, wherein said step profile responses are selected to produce an accurate reconstructed measurement at a selected intermediate part of a bed squeezed between two shoulder beds having resistivities significantly different from that of the squeezed bed;
    matching the original log and the reconstructed log and refining the provisional bed resistivities and/or bed boundaries on the basis thereof until the match based on the most recent refinement meets selected criteria; and
    producing a tangible representation of an improved resistivity log based on the most recent set of refined bed boundaries and bed resistivities.

2. A well logging process as in claim 1 in which said tangible representation comprises a rectangularized log of the subsurface conductivity versus depth in the borehole.

3. A well logging process as in claim 1 in which said tangible representation comprises a non-rectangularized, improved resistivity log characterized by higher vertical resolution, including sharper response to thin beds, than the original resistivity log.

4. A well logging process as in claim 1 or 2 in which said tangible representation is a visible log trace on a record medium.

5. A well logging process comprising the following machine-implemented steps:
    passing an resistivity tool through a borehole to derive an original resistivity log thereof;
    finding, from a log of the same borehole or subsurface formation which can be said original resistivity log, provisional bed boundary depth levels and bed conductivities of a provisional layered formation traversed by the borehole;
    producing, from said provisional boundary depth levels and bed conductivities, a provisional reconstructed resistivity log by linearly superposing respective known step profile responses of the resistivity tool to conductivity step profiles consistent with respective ones of said provisional boundaries and bed conductivities;
    matching the original log and the reconstructed log and refining the provisional bed conductivities and/or bed boundaries on the basis thereof until the match based on the most recent refinement meets selected criteria; and
    producing a tangible representation of an improved resistivity log based on the most recent set of refined bed boundaries and bed conductivities.

6. A well logging process as in claim 5 in which said tangible representation comprises a rectangularized log of the subsurface conductivity versus depth in the borehole.

7. A well logging process as in claim 5 in which said tangible representation comprises a non-rectangularized, improved resistivity log characterized by higher vertical resolution, including sharper response to thin beds, than the original resistivity log.

8. A well logging process as in claim 5 or 6 in which said tangible representation is a visible log trace on a record medium.

9. A well logging system comprising:
    means for deriving an original resistivity log produced by an resistivity tool passed through a borehole; and
    means for finding, from a log of the same borehole or subsurface formation which can be said original resistivity log, provisional bed boundary depth levels and bed conductivities of a provisional layered formation traversed by the borehole, producing therefrom a provisional reconstructed resistivity log by linearly superposing respective known step profile responses of the resistivity tool to conductivity step profiles consistent with respective ones of said provisional boundaries and bed conductivities, matching the original log and the reconstructed log and refining the provisional bed conductivities and/or bed boundaries on the basis thereof until the match based on the most recent refinement meets selected criteria, and producing a tangible representation of an improved resistivity log based on the most recent set of refined bed boundaries and bed conductivities.

10. A well logging system as in claim 9 in which said tangible representation comprises a rectangularized log of the subsurface conductivity versus depth in the borehole.

11. A well logging system as in claim 9 in which said tangible representation comprises a non-rectangularized, improved resistivity log characterized by higher vertical resolution, including sharper response to thin beds, than the original resistivity log.

12. A well logging system as in claim 9 or 10 in which said tangible representation is a visible log trace on a record medium.

* * * * *